(12) United States Patent
Coers et al.

(10) Patent No.: US 7,805,921 B2
(45) Date of Patent: Oct. 5, 2010

(54) REEL HEIGHT CONTROL FOR FLEXIBLE CUTTING PLATFORM IN AN AGRICULTURAL HARVESTING MACHINE

(75) Inventors: Bruce Alan Coers, Hillsdale, IL (US);
Paul David Marvin, DeWitt, IA (US);
Benjamin Max Lovett, Colona, IL (US)

(73) Assignee: Deere & Company, Moline, IL (US)

( * ) Notice: Subject to any disclaimer, the term of this patent is extended or adjusted under 35 U.S.C. 154(b) by 1019 days.

(21) Appl. No.: 11/452,774

(22) Filed: Jun. 14, 2006

(65) Prior Publication Data
US 2007/0289278 A1 Dec. 20, 2007

(51) Int. Cl.
*A01D 43/02* (2006.01)
(52) U.S. Cl. ............................................. 56/364
(58) Field of Classification Search .............. 56/10.2 R, 56/10.2 E, 14.9, 15.1, 15.2, 15.7, 15.8, 15.9, 56/16.1, 17.1, 364
See application file for complete search history.

(56) References Cited

U.S. PATENT DOCUMENTS

| | | | | |
|---|---|---|---|---|
| 3,698,164 A | | 10/1972 | Boone et al. | |
| 3,982,383 A | * | 9/1976 | Mott | 56/11.6 |
| 4,124,970 A | * | 11/1978 | Bernhardt | 56/10.2 E |
| 4,204,383 A | | 5/1980 | Milliken, Jr. | |
| 4,280,318 A | * | 7/1981 | Koch | 56/221 |
| 4,800,711 A | * | 1/1989 | Hurlburt et al. | 56/219 |
| 6,202,397 B1 | | 3/2001 | Watts | |
| 6,675,568 B2 | * | 1/2004 | Patterson et al. | 56/208 |
| 2007/0193243 A1 | | 8/2007 | Schmidt et al. | |

FOREIGN PATENT DOCUMENTS

GB    1096140 A    12/1967

OTHER PUBLICATIONS

European Search Report dated Sep. 27, 2007, (6 pages).

* cited by examiner

*Primary Examiner*—Alicia M Torres

(57) ABSTRACT

An agricultural harvesting machine includes a feeder housing and a cutting platform attached to the feeder housing. The cutting platform includes at least one platform section, with each platform section having a frame, a cutterbar assembly at a leading edge of the platform section, and an excessive localized deflection indicator associated with the cutterbar assembly. One or more pairs of reel support arms are provided, with each pair associated with a corresponding reel. Each pair of reel support arms is movable toward and away from the cutterbar assembly, dependent upon a state of the excessive localized deflection indicator.

5 Claims, 6 Drawing Sheets

REEL HEIGHT CONTROL FOR FLEXIBLE CUTTING PLATFORM IN AN AGRICULTURAL HARVESTING MACHINE

FIELD OF THE INVENTION

The present invention relates to agricultural harvesting machines, such as combines, and, more particularly to agricultural harvesting machines including a cutting platform with a belt conveyor.

BACKGROUND OF THE INVENTION

An agricultural harvesting machine such as a combine includes a head and a feeder housing which remove the crop material from the field, gather the crop material and transport the crop material to a separator. In the case of thinner stemmed crops such as soybeans, wheat, etc. which may be cut with a sickle bar carrying a plurality of knives, the head may also be known as a cutting platform. The separator removes the grain crop material from the non-grain crop material. The grain is cleaned and deposited in a grain tank. When the grain tank becomes full, an unloading auger which is positioned alongside the combine during harvesting is moved to the unloading position in which the auger extends approximately perpendicular to the longitudinal axis of the combine. The combine drives alongside a vehicle into which the grain is to be unloaded, such as a semi-trailer, and the unloading auger is actuated to discharge the grain into the vehicle.

A cutting platform may generally be of two types. One type typically has a sheet metal floor with a dual feed auger near the rear of the cutting platform for feeding the crop material longitudinally to the feeder housing. A cutting platform of this type with auger feed is more common.

Another type of cutting platform, also known as a draper platform, utilizes a flat, wide belt, referred to as a draper or draper belt to convey crop material. The arrangement and number of belts vary among platforms. One style of draper platform has two side belts that convey crop material longitudinally, to the center of the platform, where a center feed belt moves the crop material laterally into the feeder housing. Each belt is wrapped around a pair of rollers, one being a drive roller and the other being an idler roller. A reel extending across the width of the platform moves the crop material from the cutterbar onto the draper belts. An example of this type draper arrangement is disclosed in U.S. Pat. No. 6,202,397, which is assigned to the assignee of the present invention.

An advantage of a draper platform is that larger amounts of crop material can be transported without plugging, etc. For example, with wide platforms approaching 40 feet or even larger, the amount of crop material transported to the feeder housing can be substantial. With an auger feed platform, the crop material may bind between the auger and the back wall of the platform. In contrast, with a draper platform, the crop material is carried on top of the belt with less chance for plugging.

Draper platforms currently in use have a rigid framework not allowing the framework to flex to any appreciable extent during use. The draper platform can be placed in a "float" position such that the cutterbar at the leading edge does not dig into the ground, but the leading edge of the platform itself cannot flex across the width of the platform as a result of uneven ground terrain. This results in some crop material being missed in ground depressions, etc., while also possibly causing a part of the cutterbar to dig into localized ground elevations (e.g., small mounds, etc.). Of course, missed crop material directly translates into missed revenue, and localized gouging of soil can cause additional repair expenses resulting from broken knives, knife guards, etc.

What is needed in the art is a draper platform which is flexible across the width of the platform on a localized basis, without interfering with the operation of the rotating reel above the platform.

SUMMARY OF THE INVENTION

The invention comprises, in one form thereof, an agricultural harvesting machine, including a feeder housing and a cutting platform attached to the feeder housing. The cutting platform includes at least one platform section, with each platform section having a frame, a cutterbar assembly at a leading edge of the platform section, and an excessive localized deflection indicator associated with the cutterbar assembly. One or more pairs of reel support arms are provided, with each pair associated with a corresponding reel. Each pair of reel support arms is movable toward and away from the cutterbar assembly, dependent upon a state of the excessive localized deflection indicator.

The invention comprises, in another form thereof, a method of operating a cutting platform in an agricultural harvesting machine, including the steps of: detecting an excessive localized deflection of a cutterbar assembly; and moving at least one reel away from the cutterbar assembly, dependent upon the detected excessive localized deflection of the cutterbar assembly.

DETAILED DESCRIPTION OF THE INVENTION

Figure 1:
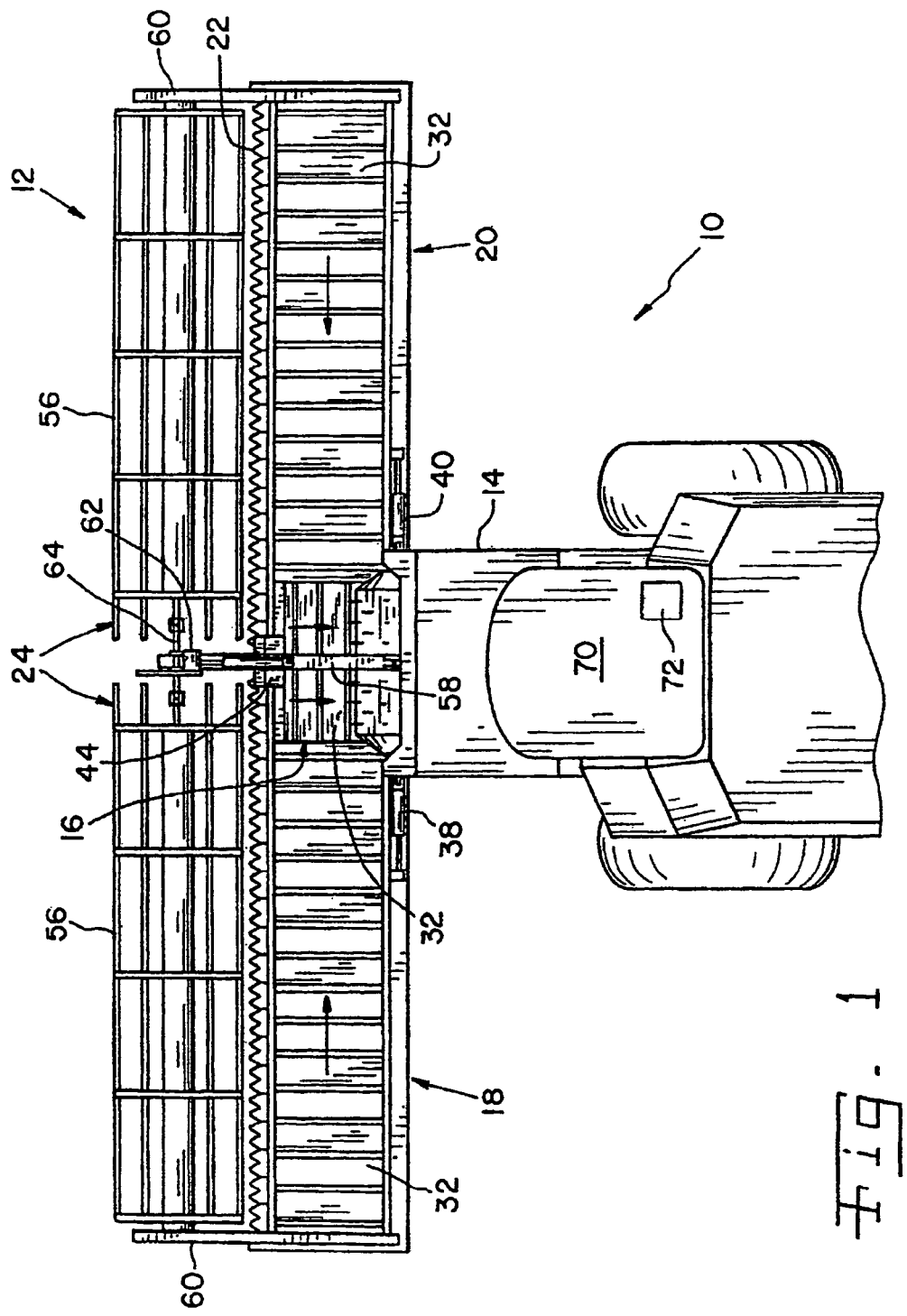
FIG. 1 is a fragmentary, top view of an agricultural combine including an embodiment of a draper platform of the present invention.
Figure 2:
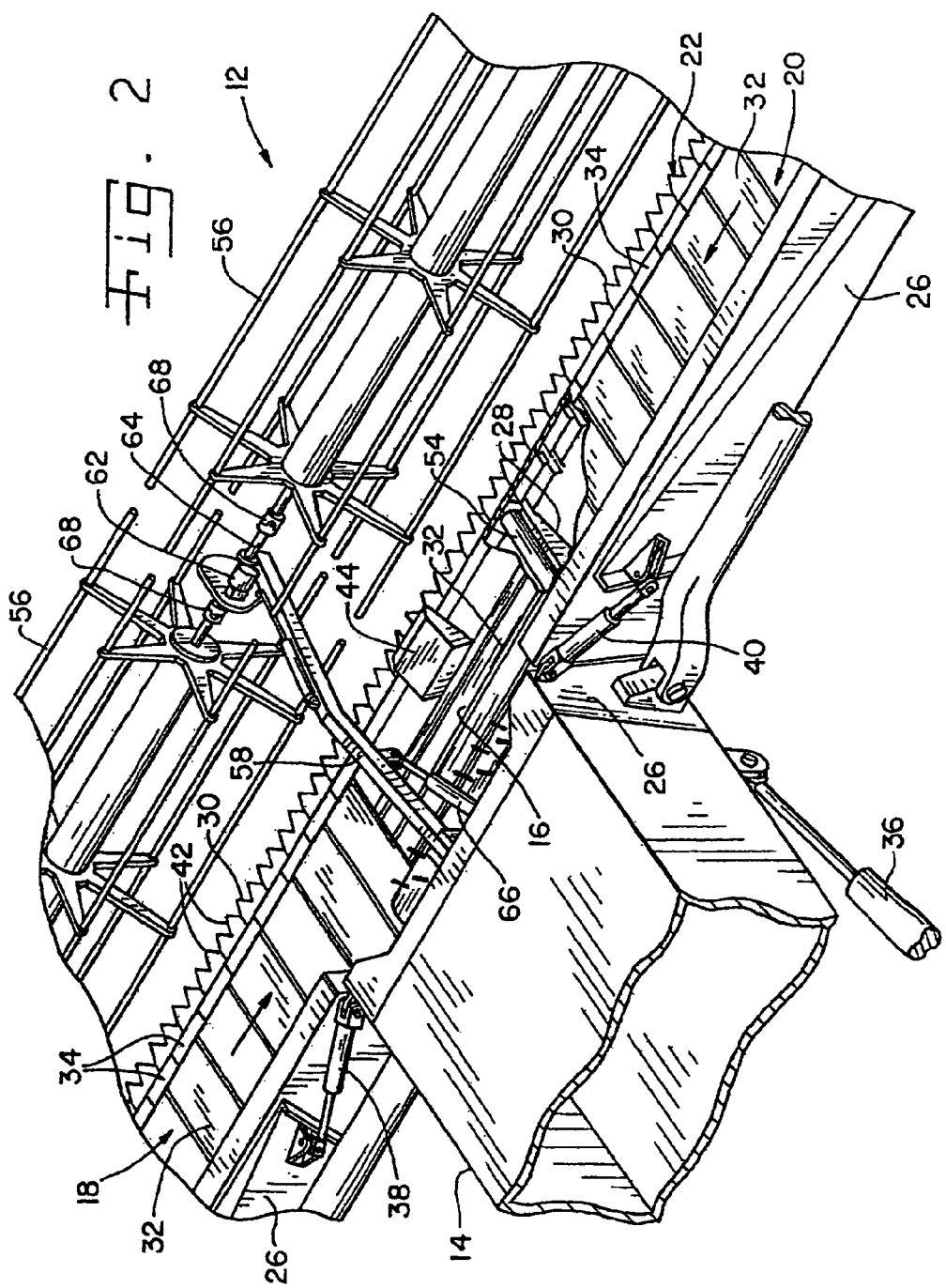
FIG. 2 is a fragmentary, perspective view of the agricultural combine of FIG. 1.

Referring now to the drawings, and, more particularly to FIGS. 1 and 2, there is shown an agricultural harvesting machine in the form of a combine 10 including an embodiment of a cutting platform 12 of the present invention. Combine 10 includes a feeder housing 14 which is detachably coupled with cutting platform 12. Feeder housing 14 receives the crop material from cutting platform 12, both grain and non-grain crop material, and transports the crop material to a separator within combine 10 in known manner (not shown). The grain crop material is separated from the non-grain crop material, cleaned and transported to a grain tank. The non-grain crop material is transported to a chopper, blower, etc. in known manner and distributed back to the field.

Cutting platform 12 generally includes a plurality of platform sections 16, 18 and 20, a cutterbar assembly 22 and a reel assembly 24. In the embodiment shown, platform section 16 is a center platform section, platform section 18 is a first wing platform section, and platform section 20 is a second wing platform section. Although shown with three platform sections, cutting platform 12 may be configured with more or less platform sections, depending upon the particular application.

Each platform section 16, 18 and 20 generally includes a frame 26, a plurality of float arms 28 coupled with a respective frame 26, a cutterbar 30 carried by the outboard ends of respective float arms 28, an endless belt 32, and a plurality of belt guides 34. The frame 26 of first wing platform section 18 and second wing platform section 20 are each pivotally coupled with center platform section 16, such that the outboard ends of first wing platform section 18 and second wing platform section 20 can move up and down independent from center platform section 16. To that end, a lift cylinder 36 coupled between the frame of combine 10 and feeder housing 14 lifts the entire cutting platform 12, a first tilt cylinder 38 coupled between the respective frame 26 of first wing platform section 18 and center platform section 16 pivotally moves first wing platform section 18 relative to center platform section 16, and a second tilt cylinder 40 coupled between the respective frame 26 of second wing platform section 20 and center platform section 16 pivotally moves second wing platform section 20 relative to center platform section 16.

Cutterbar assembly 22 includes two cutterbars 30 carried at the outboard ends of float arms 28 (i.e., at the leading edge of a platform section 16, 18 or 20). Each cutterbar 30 includes a plurality of knives 42 carried by a bar (not specifically shown). The particular type of knife can vary, such as a double blade knife (as shown) or a single blade knife. The bar is formed from a metal which is flexible to an extent allowing a desired degree of flexure across the width of cutting platform 12. In the embodiment shown, a majority of each cutterbar 30 is carried by a respective first wing platform section 18 or second wing platform section 20, with a lesser extent at the adjacent inboard ends of each cutterbar 30 being carried by center platform section 16. Cutterbars 30 are simultaneously driven by a single knife drive 44, providing reciprocating movement in concurrent opposite directions between cutterbars 30. It is also possible to reciprocally drive cutterbars 30 with multiple knife drives, which can be positioned at the adjacent, inboard ends or the outboard ends of cutterbars 30.

A plurality of knife guards 46 are positioned in opposition to knives 42 for providing opposing surfaces for cutting the crop material with knives 42. A plurality of keepers 48 spaced along cutterbars 30 have a distal end above cutterbars 30 for maintaining cutterbars 30 in place during reciprocating movement.

Float arms 28 may be pivoted at their connection locations with a respective frame 26. A float cylinder 50 coupled between a respective frame 26 and float arm 28 may be used for raising or lowering the outboard end of float arm(s) 28 at the leading edge of cutting platform 12. Each float cylinder 50 may also be placed in a "float" position allowing the connected float arm 28 to generally follow the ground contour during operation. More particularly, each float cylinder 50 is fluidly connected with an accumulator 52 carried by a platform section 16, 18 or 20. Accumulator 52 allows fluid to flow to and from attached float cylinders 50 such that no pressure build-up occurs. In this manner, the rams associated with each float cylinder 50 are free to move back and forth longitudinally, thereby allowing float arms 28 to follow the ground contour. When not in a float mode, float cylinders 50 can be actuated to move float arms 28 in an upward or downward direction. In the embodiment shown, each float cylinder 50 is a hydraulic cylinder, but could possibly be configured as a gas cylinder for a particular application.

Each float arm 28 is also associated with a respective roller 54. The plurality of rollers 54 for each platform section 16, 18 and 20 carry and are positioned within a loop of a respective endless belt 32. At the inboard end of first wing platform section 18 and second wing platform section 20 is a driven roller, and at the outboard end of first wing platform section 18 and second wing platform section 20 is an idler roller. The rollers positioned between the inboard drive roller and outboard idler roller at each float arm 28 also function as idler rollers. It will be appreciated that the number of float arms 28, and thus the number of rollers 54, may vary depending upon the overall width of cutting head 12 transverse to the travel direction.

Reel assembly 24 includes two reels 56, center reel support arm 58 and a pair of outer reel support arms 60. Each reel 56 carries a plurality of tines for moving the crop material onto platform sectionals 16, 18 and 20. Outer reel support arms 60 are pivotally coupled at one end thereof with an outboard end of a respective first wing platform section 18 or second wing platform section 20. Outer reel support arms 60 rotationally carry a respective reel 56 at an opposite end thereof. Each outer reel support arm 60 may be selectively moved up and down using a hydraulic cylinder, and the pair of hydraulic cylinders are typically coupled in parallel so that they move together upon actuation.

Center reel support arm 58 is pivotally coupled at one end thereof with center platform section 16 above the opening leading to feeder housing 14. Center reel support arm 58 rotationally carries an inboard end of each reel 56 at an opposite end thereof. A hydraulic motor 62 or other suitable mechanical drive rotationally drives each reel 56. More particularly, hydraulic motor 62 drives a common drive shaft 64 through a chain and sprocket or other suitable arrangement (not shown). The rotational speed of reels 56 can be adjusted by an operator by adjusting the rotational speed of hydraulic motor 62.

Center reel support arm 58 may be selectively moved up and down using a hydraulic cylinder 66. Center reel support arm 58 is movable independently from outer reel support arms 60. To accommodate this independent movement, drive shaft 64 driven by hydraulic motor 62 is coupled at each end thereof via a universal joint 68 with a respective reel 56. This independent movement of center reel support arm 58 can be accomplished manually using a separate actuating switch or lever in operator's cab 70, or automatically using an electronic controller 72 located within cab 70 or other suitable location.

Figure 3:
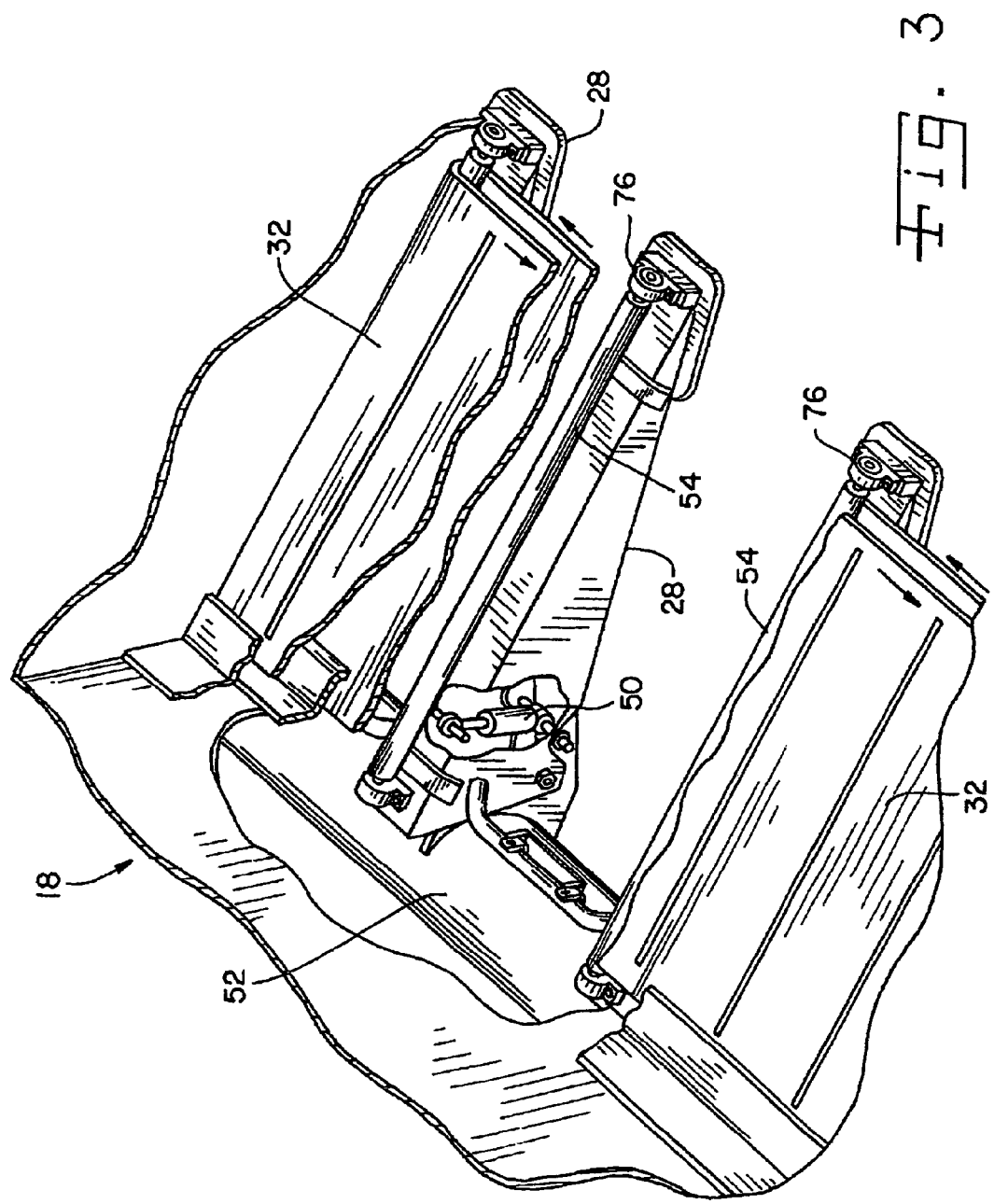
FIG. 3 is a fragmentary, perspective view of the cutting platform shown in FIGS. 1 and 2.
Figure 4:
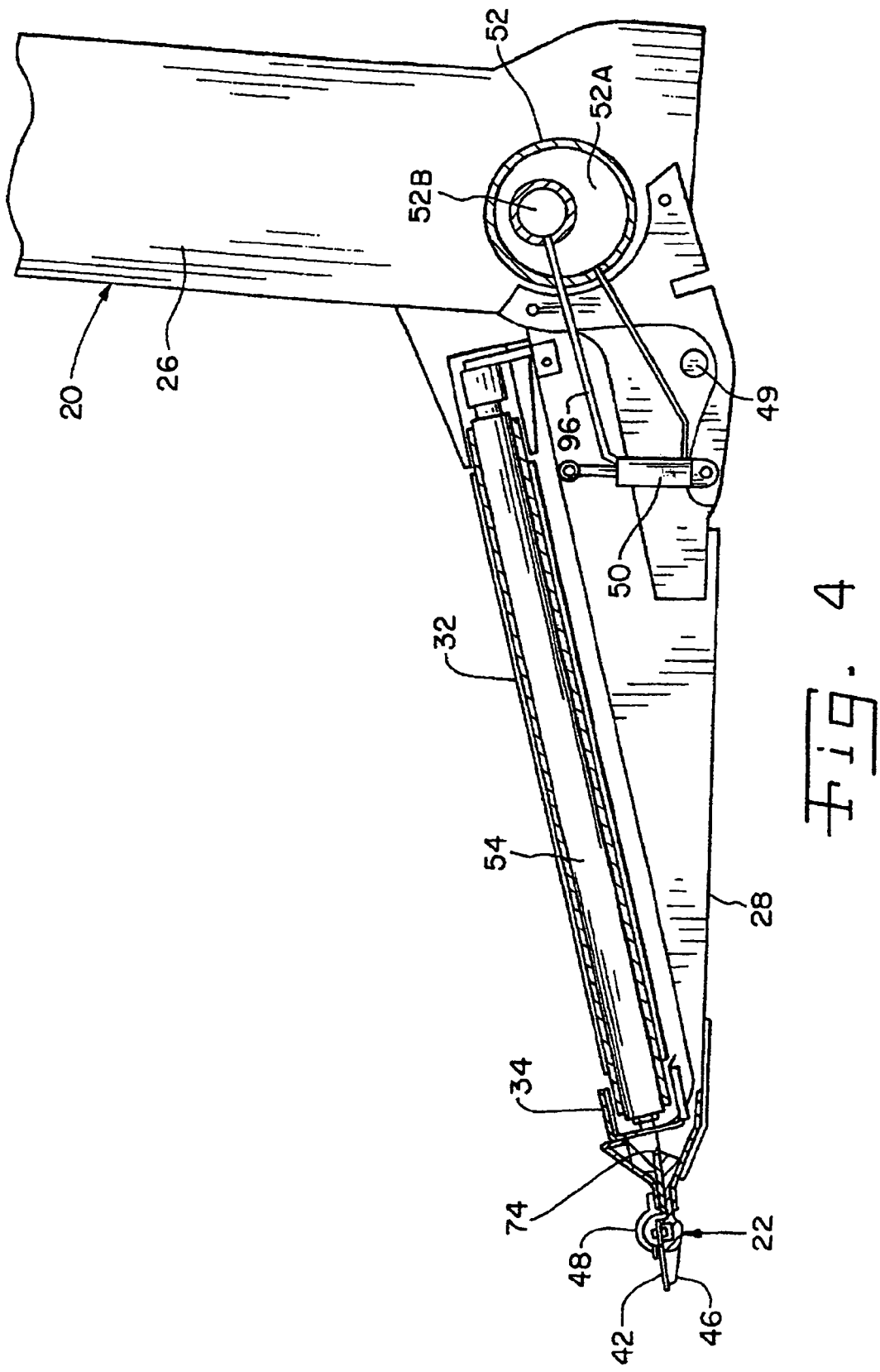
FIG. 4 is a side, sectional view through a wing platform section shown in FIGS. 1 and 2.

Each platform section 16, 18 and 20 has a leading edge which is configured to allow cutterbar assembly 22 to flex an appreciable extent in a localized manner across the width of cutting platform 12. Referring to FIGS. 3 and 4, each float arm 28 has a distal end adjacent the leading edge of cutting platform 12. The float arms 28 associated with each respective platform section 16, 18 and 20 each have a distal end which is fastened to a knife guard 46, flexible substrate 74, crop ramp 76 and hold down 48. Flexible substrate 74 for each particular platform section 16, 18 and 20 in essence forms the backbone to which the other modular components are mounted and allows flexibility of the platform section across the width thereof. A bushing housing 76 also mounted to flexible substrate 74 carries a bushing (not shown) which rotatably supports roller 54. In the embodiment shown, flexible substrate 74 is a steel plate with various mounting holes formed therein, and has a modulus of elasticity providing a desired degree of flexibility. The geometric configuration and material type from which flexible substrate 74 is formed may vary, depending upon the application.

Figure 6:
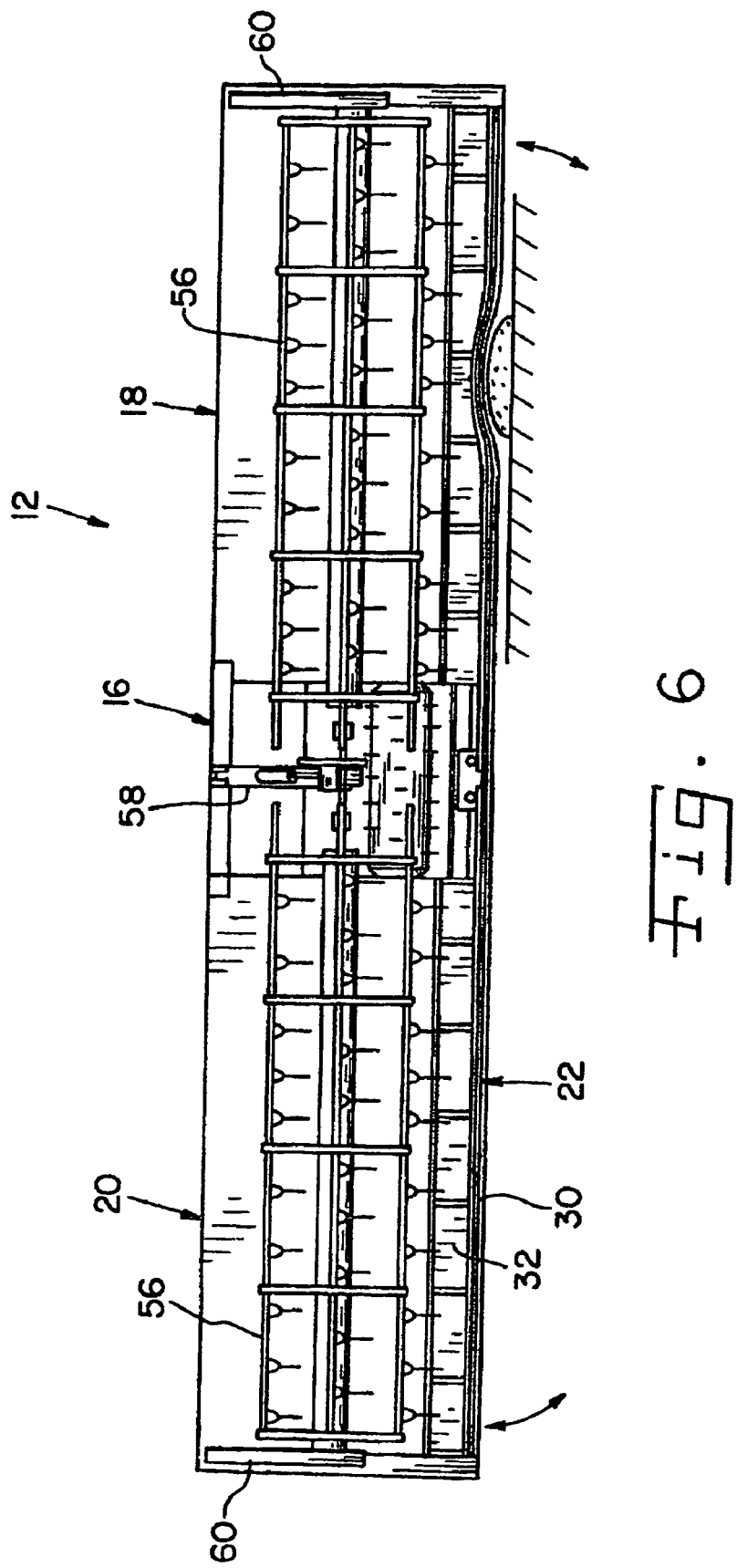
FIG. 6 is a plan view of the cutting platform shown in FIGS. 1, 2 and 4, while traversing a localized ground protrusion.

In the embodiment shown, each float arm 28 is provided with a passive stop allowing the float arm to move to a normal stop position during normal operation, and past the normal stop position to an overload stop position during an overload condition. Such a condition may occur, for example, when cutterbar assembly 22 is biased upward in a localized manner from a ground protrusion or obstruction, such as a rock, log, mound of dirt, etc. (see FIG. 6). Absent the use of a passive stop, each float arm 28 can reach a hard stop at the upper-most travel position, after which further biasing by the ground protrusion may place the weight of the entire cutting platform 12 and/or feeder housing 14 on a single float arm 28. This is undesirable since the float arms 28 must be designed to accommodate such weight, which of course adds to the bulk, weight and cost of cutting platform 12. On the other hand, allowing one or more float arms 28 to pivot upwards past the normal stop position during extreme conditions prevents undue stress on the float arm, which in turn allows the size of each float arm 28 to be smaller.

Figure 5:
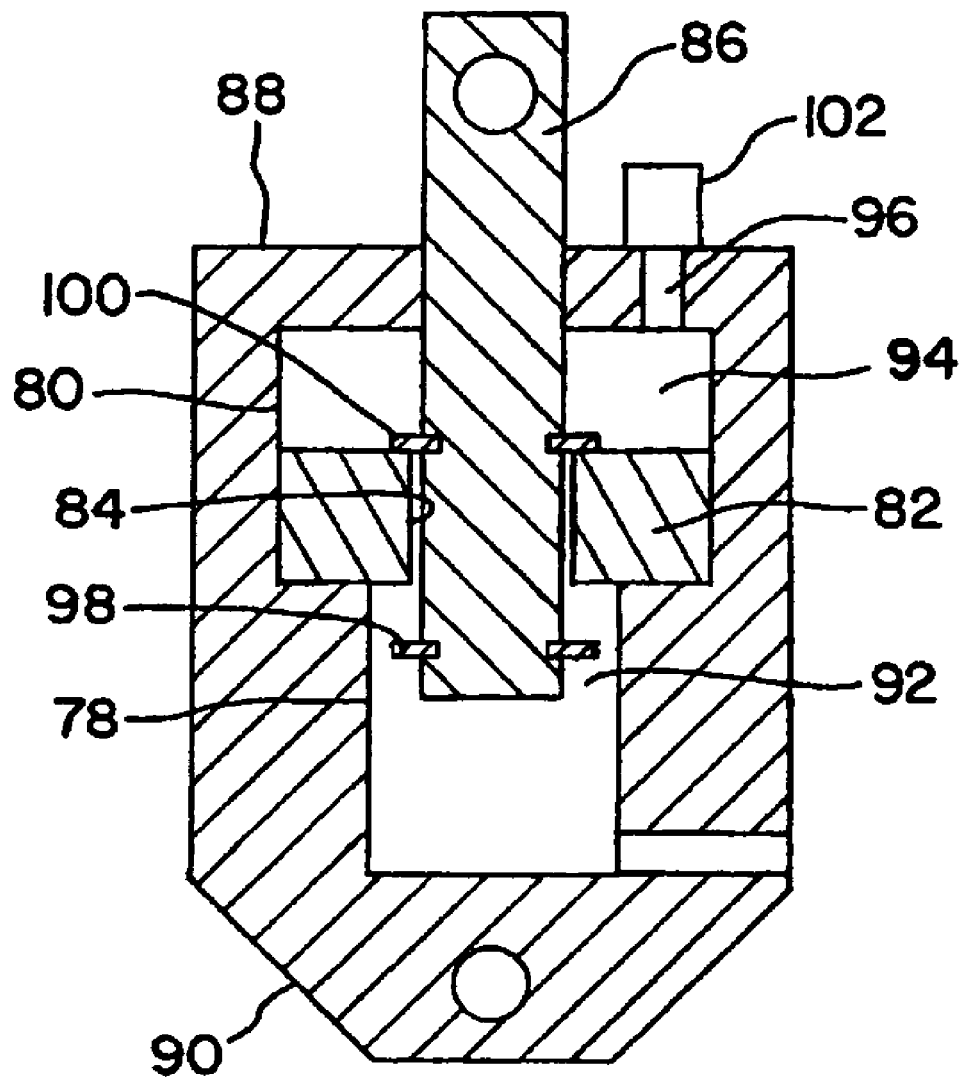
FIG. 5 is a side sectional view through the float cylinder shown in FIGS. 3 and 4.

More particularly, referring to FIGS. 4 and 5, each float cylinder 50 associated with a respective float arm 28 is identically configured as a dual bore cylinder, with a first bore 78 and a larger diameter second bore 80. A floating piston 82 is free floating within second bore 80, and has an inner bore 84 with an inside diameter which is just slightly larger than an outside diameter of rod 86. Floating piston 82 is slidably movable back and forth within second bore 80 adjacent a distal end 88 of float cylinder 50 from which rod 86 extends. Floating piston 82 is movable to a normal stop position shown in FIG. 5 adjacent first bore 78, and an overload stop position adjacent distal end 88.

The variable volume area within first bore 78 between floating piston 82 and proximal end 90 defines a fluid chamber 92 which can either be placed in a "float" state or which receives high pressure fluid from accumulator chamber 52A for extending rod 86 to lift a corresponding float arm 28. The variable volume area within second bore 80 between floating piston 82 and distal end 88 defines a fluid chamber 94 which is in fluid communication with accumulator chamber 52B via fluid line 96. The pressure within accumulator chamber 52B and fluid chamber 94 is set to provide a normal stop position for rod 86. To that end, rod 86 includes a first retainer 98 and a second retainer 100 which are positioned on opposite sides of and engage floating piston 82. In the embodiment shown, each of first retainer 98 and second retainer 100 are configured as snap rings, but may be differently configured depending upon the application. Under normal operating conditions, first retainer 98 engages against the bottom of floating piston 82 which limits the stroke length of rod 86 from distal end 88. However, in the event of a localized extreme upward deflection of cutterbar assembly 22, and in turn the outboard end of float arm 28, the pressure exerted by first retainer 98 against floating piston 82 exceeds the predetermined pressure within second bore 80, thus allowing movement of floating piston 82 and further movement of rod 86. Movement of floating piston 82 away from the normal stop position provides an excessive localized deflection indicator of cutterbar assembly 22. The fluid which is expelled from fluid chamber 94 is discharged to accumulator chamber 52B under substantially constant pressure. The maximum overload stop position occurs at a point in which floating piston 82 second retainer 100 is immediately adjacent distal end 88.

In the embodiment shown, accumulator 52 is shown as including two concentrically arranged accumulator chambers 52A and 52B operating at different pressures for compactness sake. However, separate accumulators each having a single accumulator chamber may also be provided.

Further, in the embodiment shown, a localized extreme upward deflection of cutterbar assembly 22 is indicated when rod 86 moves past the normal stop position. This can be detected, for example, by sensing the pressure of the fluid within fluid chamber 94 above a predetermined pressure using a sensor 102 and providing an output signal to controller 72. Other methods of indicating extreme upward deflection of cutterbar assembly 22 can also be used. For example, a single pressure sensor can be used to sense an increase in the pressure within accumulator chamber 52B. This is a simpler method of determining an overload condition in a float cylinder 50, but does not provide an indication of which float cylinder 50 was in an overload state. Alternatively, the position of rod 86 can be sensed to determine if the stroke length has exceeded the normal stroke length at the normal stop position. Rod 86 could be encoded such as with magnetic or optical encoding to determine when rod 86 has passed the normal stop position. Further, it is possible to sense the angular position of each float arm 28 relative to frame 26 to determine when a float arm 28 has passed the normal stop position.

Regardless of the particular method used, reel 56 above a float arm 28 which is determined to have moved past the normal stop position is automatically raised to avoid tines coming into contact with cutterbar assembly 22, which could result in damage to knives 42 and/or tines. Reel 56 can be raised by raising center reel support arm 58 and/or outer reel support arm 60. The longitudinal position of the particular float arm 28 relative to the support arms 58 and 60 can be used to determine the extent to which support arm(s) 58 and/or 60 must be raised to avoid interference between tines and cutterbar assembly 22. In the event the exact position of rod 86 is not known after traveling past the normal stop position, such as using the hydraulic passive stop of float cylinders 28 described above, then reel 56 can be moved to the extent necessary to ensure clearance when floating piston 82 second retainer 100 is at the maximum overload stop position immediately adjacent distal end 88. On the other hand, when the exact position of rod 86 is known after traveling past the normal stop position, such as by sensing the stroke length of rod 86 or angular orientation of float arm 28, then reel 56 is only moved an extent necessary to ensure clearance with cutterbar assembly 22 (i.e., there need not be an extra safety margin in this instance). Onboard controller 72 receives one or more sensor signals indicating that a float arm 28 has traveled past the normal stop position, (optionally) a relative location of the float arm 28, and (optionally) the extent of travel past the normal stop position, and actuates reel support arm 58 and/or 60 accordingly. As a simpler approach, it is also possible to raise both reels 56 a predetermined distance upon determining that one or more float arms 28 are in an overload condition.

During harvesting operation, cutting platform 12 is placed in a "float" position as combine 10 traverses across the ground. Typically, a field is opened by making several rounds around the periphery of the field. Combine 10 is then moved back and forth across the field, with the combine being shifted approximately the width of cutting platform 12 for each pass across the field. At opposite ends of the field, the cutting platform 12 is raised while the combine is being turned around for the next pass. Under normal operating conditions, the outboard ends of float arms 28 float up and down between the top and bottom normal stop positions as cutting platform 12 moves across the field. In the event cutterbar assembly 22 encounters an abrupt localized ground protrusion (FIG. 6), controller 72 determines that a float arm 28 has traveled past a normal stop position and actuates a reel support arm 58 and/or 60 to provide a clearance distance between tines and cutterbar assembly 22.

Having described the preferred embodiment, it will become apparent that various modifications can be made without departing from the scope of the invention as defined in the accompanying claims.

The invention claimed is:

1. An agricultural harvesting machine, comprising:
   a feeder housing; and
   a cutting platform attached to said feeder housing, said cutting platform including:
      at least one platform section, each said platform section having a frame, a cutterbar assembly at a leading edge of each said platform section;
      at least one reel; and
      at least one pair of reel support arms, each said pair of reel support arms associated with a corresponding said reel;
   wherein each said platform section includes a plurality of float arms pivotally coupled with said frame, and an endless belt carried by said plurality of float arms,
   a plurality of float cylinders, each said float cylinder associated with a respective said float arm and including a passive stop; and
   a plurality of excessive localized deflection indicators, each said indicator being associated with the cutterbar assembly and with a respective float arm and comprising one of a pressure sensor and a position indicator associated with a respective said float cylinder;
   wherein each of said pair of reel support arms is configured to be movable by a controller toward and away from said cutter bar assembly dependent upon a state of said plurality of excessive localized deflection indicators.

2. The agricultural harvesting machine of claim 1, wherein each said float cylinder includes a passive stop, each said indicator associated with a respective said passive stop.

3. A cutting platform for use with an agricultural harvesting machine, comprising:
   at least one platform section, each said platform section having a frame, a cutterbar assembly at a leading edge of each said platform section;
   at least one reel; and
   at least one pair of reel support arms, each said pair of reel support arms associated with a corresponding said reel;
   wherein each said platform section includes a plurality of float arms pivotally coupled with said frame, and an endless belt carried by said plurality of float arms;
   a plurality of float cylinders, each said float cylinder associated with a respective said float arm and including a passive stop; and
   a plurality of excessive localized deflection indicators, each said indicator being associated with the cutterbar assembly and with a respective float arm and comprising one of a pressure sensor and a position indicator associated with a respective said float cylinder;
   wherein each of said pair of reel support arms is configured to be movable by a controller toward and away from said cutter bar assembly dependent upon a state of said plurality of excessive localized deflection indicators.

4. The cutting platform of claim 3, wherein each said float cylinder includes a passive stop, each said indicator associated with a respective said passive stop.

5. A method of operating a cutting platform in an agricultural harvesting machine, comprising the steps of:
   detecting by a controller an excessive localized deflection of a cutterbar assembly; and
   moving by a controller at least one reel away from said cutterbar assembly, dependent upon said detected excessive localized deflection of said cutterbar assembly;
   wherein said cutting platform includes a plurality of float arms carrying said cutterbar assembly and a plurality of float cylinders, each said float cylinder associated with a respective said float arm, said detecting step comprising detecting a position of at least one said float cylinder.

* * * * *